United States Patent [19]

Manzoni

[11] 4,306,465
[45] Dec. 22, 1981

[54] DEVICES FOR THE REMOTE CONTROL OF A VEHICLE REARVIEW MIRROR

[76] Inventor: Stéphane Manzoni, 1, rue Pasteur, Saint-Claude, France, 39200

[21] Appl. No.: 112,287

[22] Filed: Jan. 15, 1980

[30] Foreign Application Priority Data

Jan. 19, 1979 [FR] France ............... 79 01415

[51] Int. Cl.³ .................. F16C 1/10
[52] U.S. Cl. .................. 74/501 M
[58] Field of Search .......... 74/501 M, 501 R

[56] References Cited

U.S. PATENT DOCUMENTS

| 3,369,427 | 2/1968 | Brighton et al. | 74/501 M |
| 3,625,385 | 12/1971 | Shrode | 74/501 M |
| 3,712,149 | 1/1973 | Van Noord | 74/501 M |

Primary Examiner—Kenneth Dorner
Attorney, Agent, or Firm—Shenier & O'Connor

[57] ABSTRACT

Improvements to devices for the remote control of a rearview mirror, adjustable from inside a vehicle, by means of a cable transmission.

The body 1 is provided with two bearings inside which is pivotally mounted an axis integral with a crosspiece which carries one end of at least a cable, the said crosspiece having at least one bearing inside which is pivotally mounted an operating lever the axis of which is perpendicular to the pivoting axis of the crosspiece, the said lever being fast in rotation with a pivoting member on which are mounted the ends of two transmission cables.

The invention is used for remotely controlling vehicle rearview mirrors.

12 Claims, 21 Drawing Figures

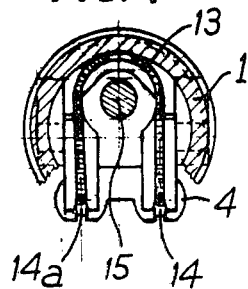
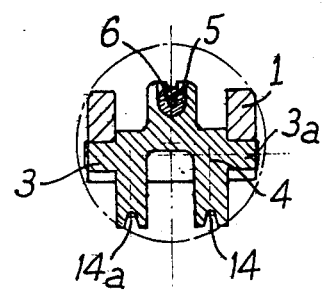
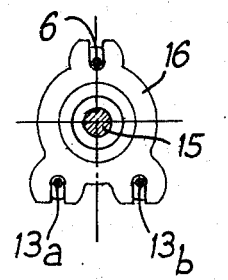
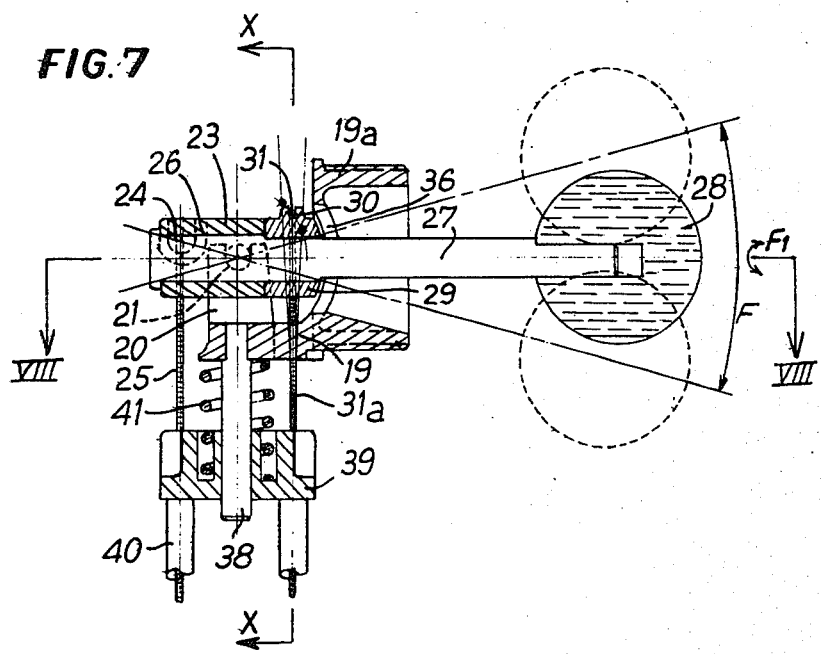

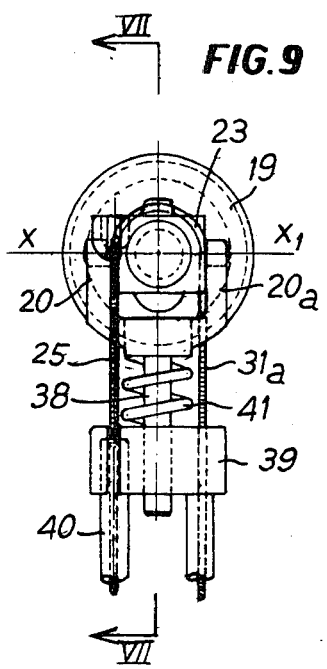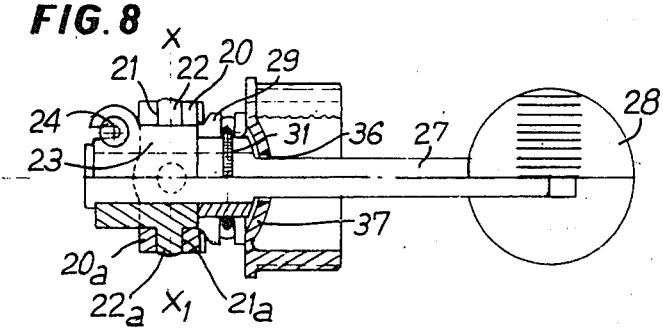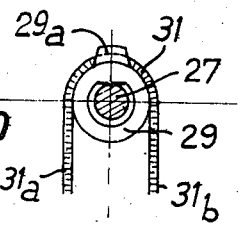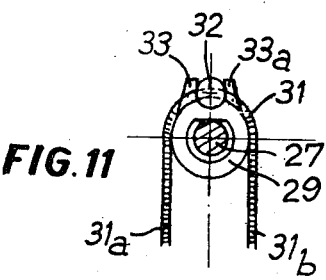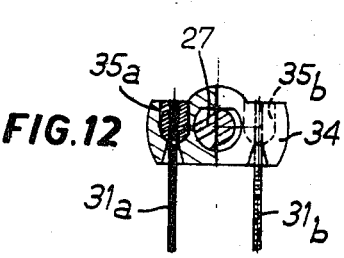

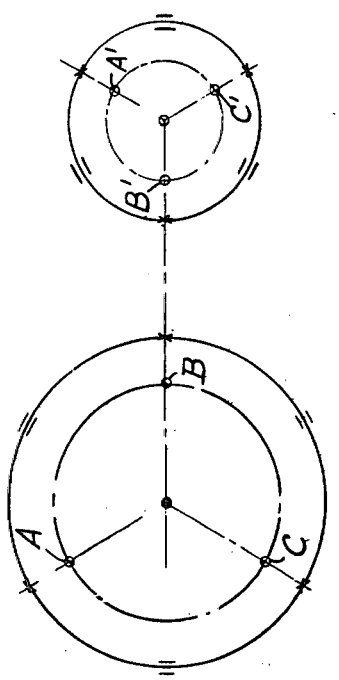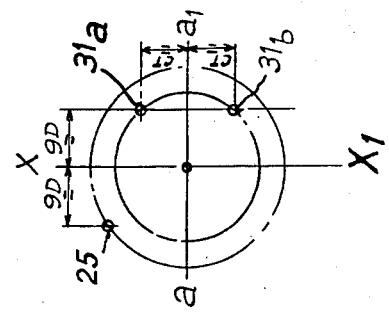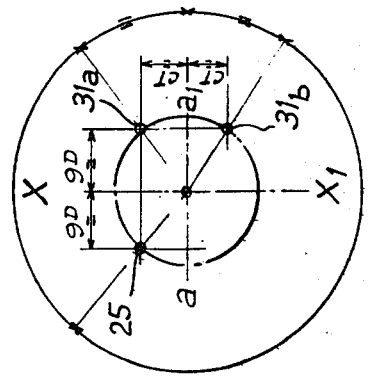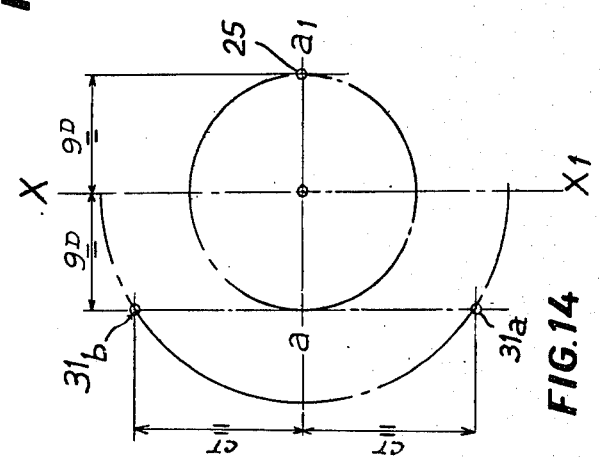

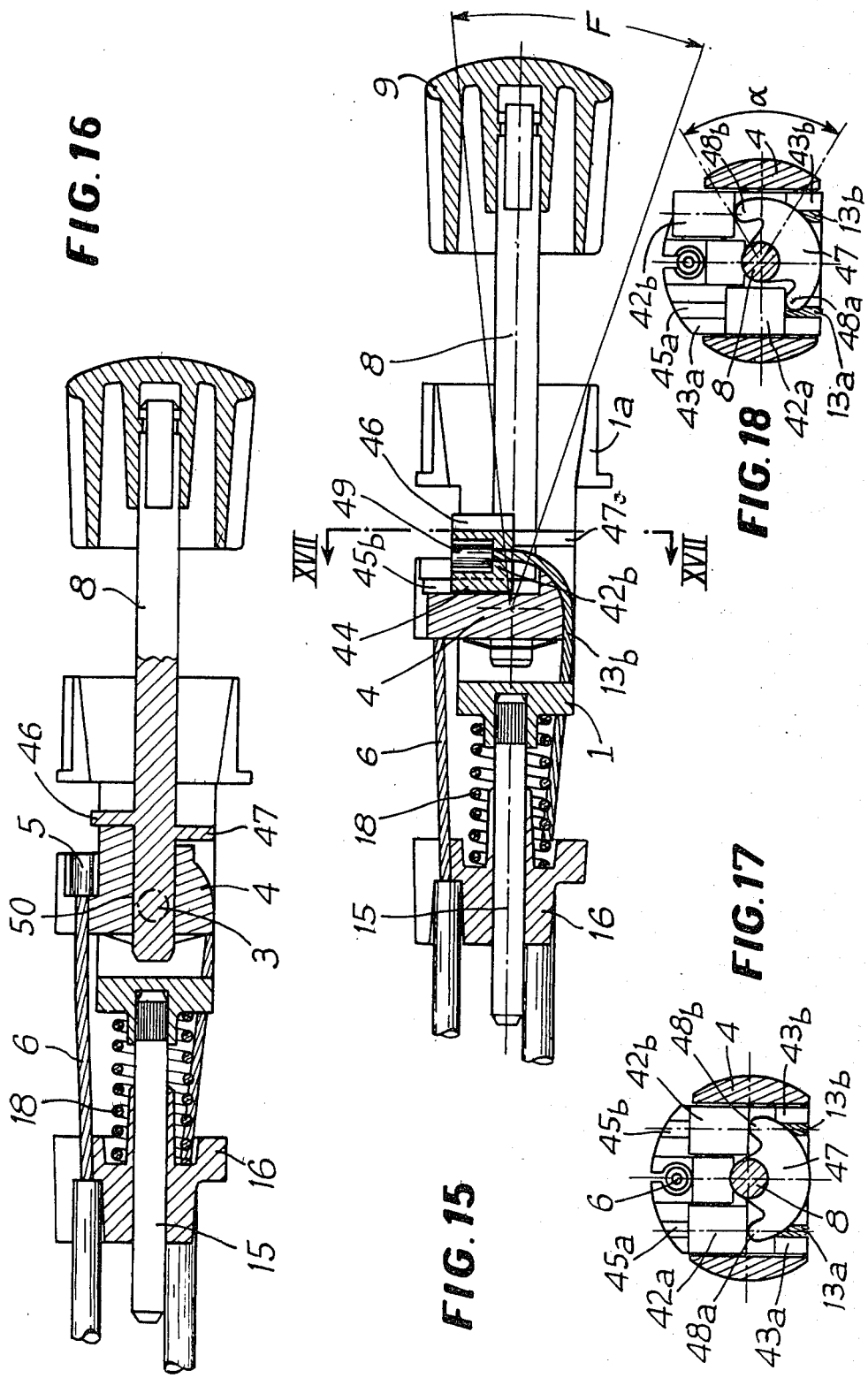

DEVICES FOR THE REMOTE CONTROL OF A VEHICLE REARVIEW MIRROR

The object of the present invention is an improvement to devices for the remote control of a vehicle rearview mirror.

Devices are known for remotely controlling a rearview mirror, adjustable from inside the vehicle, wherein the mirror is pivotally mounted in a housing by means of a swivel joint connected by three transmission cables to a control means constituted by a swivel joint provided with an operating lever.

In the known devices, the control means, which is preferably fitted on the vehicle door or on a door gusset, is mainly constituted of a body inside which is pivotally mounted a swivel joint which supports the ends of the three cables, and which is actuated by means of an operating lever. However, the use of a swivel joint does not permit to obtain a reduction greater than 2 to 1, because the possible angular movement of the lever is approximately 30°, this allowing the rearview mirror to move of about 15°.

The points where the three cables are connected to the control member and to the mirror holder are all inscribed on the same pitch diameter, with angular inter-axes distances of 120° between them. The pitch diameter of the cables on the control member by being approximately half that of the cables on the mirror holder, gives the useful reduction. Now, with such a reduction of 2 to 1, the control of the mirror has been found to be too direct and inaccurate, especially for the control of the "North-South" movement.

The known arrangement which consists in using a swivel joint, does not permit to obtain a reduction of the pitch diameter along which are situated the axes of the cables and, as a result, an increase of reduction ratio, which is what the user wants.

To obtain another disposition of the axes of the cables, the invention proposes to use another pivoting means.

According to the invention, the body is provided with two bearings inside which is pivotally mounted an axis which is fast with a crosspiece carrying one end of at least one cable, the said crosspiece having at least one bearing inside which is pivotally mounted an operating lever of which the axis is perpendicular to the pivoting axis of the crosspiece, the said lever being fast in rotation with a pivoting member on which are mounted the ends of two transmission cables situated on the side opposite the cable which is fast with the crosspiece with respect to the pivoting axis of the said crosspiece.

With this disposition of the transmission cables on the control member and on the controlled mirror, it is possible to increase adequately the reduction ratio, for example by 4 to 1.

The present invention will be more readily understood on reading the following description with reference to the accompanying drawings in which:

FIG. 4 is a cross-section along line IV—IV of FIG. 2;

FIG. 5 is a cross-section along line V—V of FIG. 1;

FIG. 6 is a plan view of the stop member of the cable sleeves;

FIG. 7 is a cross-sectional view of another embodiment of the device, along line VII—VII of FIG. 9, FIG. 8 is a cross-section along line VIII—VIII of FIG. 7;

FIG. 9 is a front elevation of the embodiment of the device shown in FIG. 7;

FIG. 10 is a cross-section along line X—X of FIG. 7;

FIG. 11 is a similar cross-sectional view to that shown in FIG. 7, but of a variant embodiment;

FIG. 12 is a similar cross-sectional view to that shown in FIG. 7, but of another variant embodiment;

FIGS. 13 and 13a are diagrammatical views showing the position of the axes of the cables on the mirror-holder and on the control member in the known devices;

FIGS. 14, 14a and 14b are diagrammatical views showing the altered position of the axes of the cables, according to the invention;

FIG. 15 is a longitudinal cross-section along a lateral plane of another embodiment of the device comprising a swivel member;

FIG. 16 is a longitudinal cross-section along an axial plane of the device shown in FIG. 15;

FIG. 17 is a cross-section along line XVII—XVII of FIG. 15; and

FIG. 18 is a similar cross-sectional view to that shown in FIG. 17, but after rotation of the lever.

Figure 1:
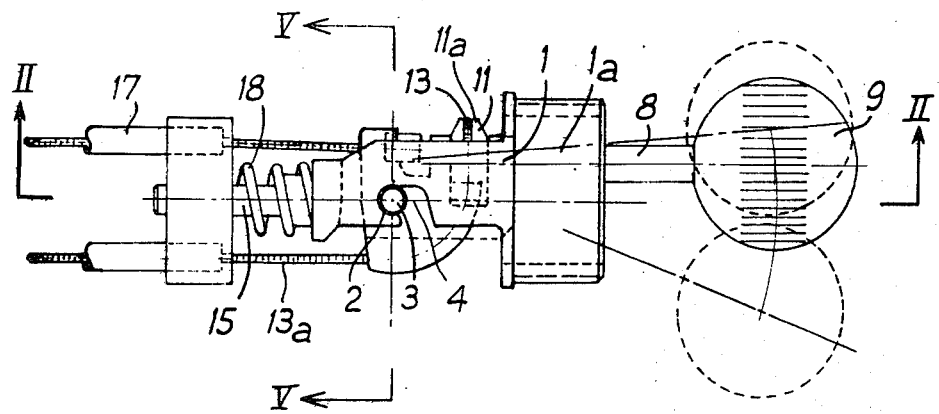
FIG. 1 is a side elevation of one embodiment of the device for the remote control of a rearview mirror.
Figure 2:
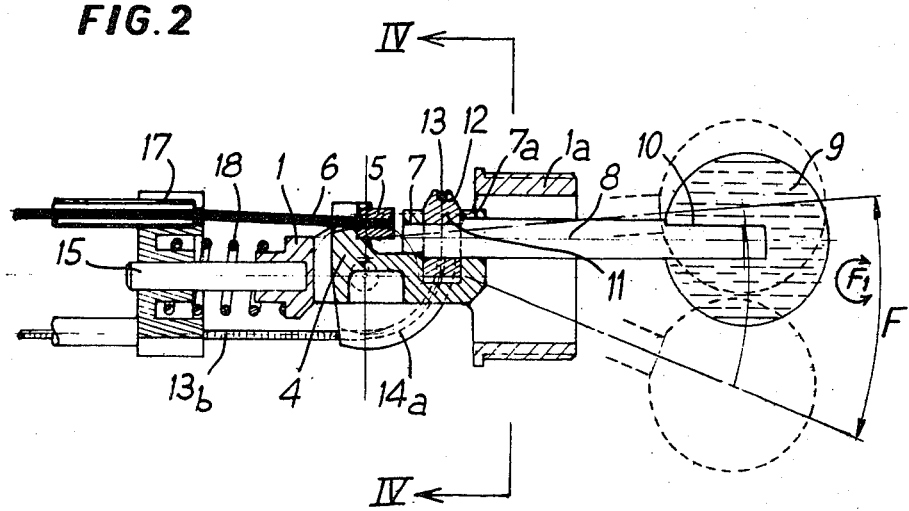
FIG. 2 is a cross-section along line II—II of FIG. 1.
Figure 3:
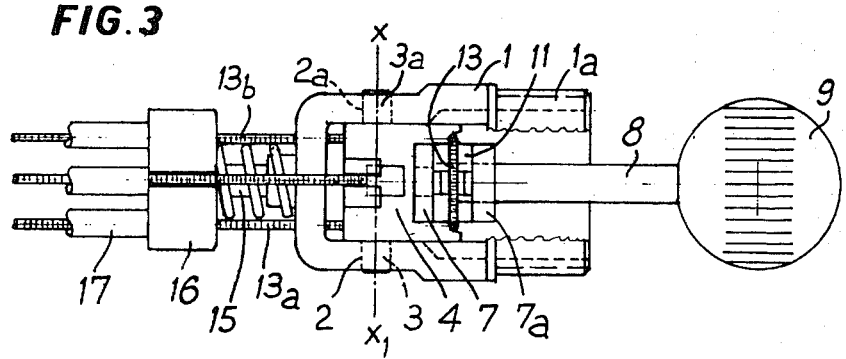
FIG. 3 is a partial cross-section seen from above of the device shown in FIG. 1.

FIGS. 1, 2 and 3 show one embodiment of a remote control device for a rearview mirror which comprises a body 1 provided with a threaded socket 1a by means of which it is secured to the base of the rearview mirror (not shown in the drawing) by means of a nut, not shown, the said base being fitted by what is known as an assembly on gusset or triangle on the vehicle door. On the body 1, are provided two bearings 2, 2a into which engage two pins 3, 3a situated along an axis $XX_1$ and integral with a crosspiece 4 (FIGS. 1, 3 and 5) supporting a boss 5 of a transmission cable 6.

The crosspiece 4 comprises two bearings 7, 7a in which is pivotally mounted one of the ends of an operating lever 8, which lever is provided at its other end with an operating knob 9 integral with the said lever by a flat portion 10. Between the bearings 7, 7a is placed a semicircular member 11 which is provided with a groove 12 inside which is mounted a cable 13 which, in effect corresponds to the connection of the ends of the cables 13a, 13b. The axis of the operating lever 8 is perpendicular to the rotation axis $XX_1$ of the crosspiece 4 which comprises grooves 14, 14a, substantially circular-shaped, for guiding the cables 13a, 13b which are parallel.

At the end of the body 1 opposite the lever 8, said body comprises a rod 15 on which is slidably mounted an abutment member 16 (FIGS. 2 and 6) against which come to rest the sleeves 17 of the cables 6, 13a and 13b. In order to keep the cables stretched, a helical spring 18 is placed between the body 1 and the stop member 16.

The device according to the invention operates as follows:

To obtain the "North-South" displacement of the mirror, the lever 8 is pivoted in the bearings 7, 7a about its axis and in this way, the semicircular member with a groove 11 is also driven in rotation and, hence, the part 13 of the two cables 13a, 13b, which are connected to corresponding points of the mirror-holder, the part 13 of the cable being encased in the groove 11.

To obtain the "East-West" displacement of the mirror, the lever 8 is actuated and moved along arrow F, so that the rotation of the crosspiece is effected along the axis $XX_1$ of the pins 3, 3a. The cable 6 and the cables 13a, 13b being situated on either side of the axis $XX_1$, there results a corresponding movement of the mirror-holder which is correspondingly connected to the cables.

FIGS. 7, 8 and 9 show another embodiment of the control device 19 wherein the lever, at middle point 0 is perpendicular to the transmission cables. The device comprises a body 19 which is provided with a threaded sleeve 19a of which the axis is perpendicular to the axis of the body, and which ensures on the inside, the fastening onto a vehicle door by means of a nut, not shown on the drawing.

The body 1 comprises two lugs 20, 20a provided at their upper part with bearings 21, 21a in which are pivotally mounted pins 22, 22a integral with a crosspiece 23 which pivots about an axis $XX_1$. One of the cables 25 is supported on the crosspiece 23 by way of a boss 24. The said crosspiece 23 is further provided with a bore 26 inside which is pivotally mounted the lever 27, which lever carries at one of its ends an operating knob 28, said lever being mounted to pivot about an axis which is perpendicular to the axis $XX_1$. On the lever 27 is keyed a pulley 29 provided with a circular groove 30 inside which is engaged a cable 31 which in effect corresponds to the connection of the ends of cables 31a, 31b, the said cable 31 being encased in the groove by means of bosses 29a.

According to a special embodiment of the invention shown in FIG. 11, the cable 31 is integral with a boss 32 which is held in position between two stop members 33, 33a integral with the pulley 29.

FIG. 12 shows another way to fix the cables 31a, 31b wherein a compensation bar 34 is used which is keyed in its middle part to the lever 27 so as to be driven in rotation therewith, and which is provided, on either side of the axis of the lever 27, with recesses inside which are engaged endpieces 35a, 35b integral with the ends of the cables 31a, 31b. The lever 27 is guided in a groove 36 made in a wall 37 (FIGS. 7, 8) provided on the sleeve 19a, the said groove ensuring axial guiding along arrow F and allowing the rotation of the lever according to arrow $F_1$.

On the body 19 and perpendicularly to the lever 27 there is fixed a rod 38 on which a stop member 39 is slidably mounted, which stop member is traversed by the transmission cables and against which rest the ends of the sleeves 40, a spring 41 being placed between the body 19 and the stop member 39.

In the case of FIGS. 7, 8 and 9, the device operates in the same way as in the case of FIGS. 1, 2 and 3, that is to say that the "North-South" movement is effected by means of cables 31, 31a and that the "East-West" movement is effected by means of cables 25 on the one hand, and cables 31a, 31b on the other.

FIGS. 13, 13a show one embodiment of the points for fastening the three cables on the mirror-holder (FIG. 13) by points A, B, C and on the control member (FIG. 13a) by points A', B', C'. The fastening points for the three cables are all inscribed on the same pitch diameter with angular inter-axes distances of 120° between them. The pitch diameter of the cables on the control member being approximately half the pitch diameter on the mirror-holder, the result is that an angular movement of the lever of approximately 30° causes the mirror to move by about 15°, i.e. a reduction of 2 to 1. Now, by placing the cables differently on the control member shown in FIGS. 14a, 14b, it is possible to obtain a greater reduction ratio, for example 4 to 1. The three output axes of the transmission cables 25, 31a, 31b are inscribed on the same pitch diameter and the two axes of the cables 31, 31a, controlling the "North-South" movement are symmetrically arranged on either side of an axis $aa_1$, whereas the axis of the third cable 25 controlling, together with the cables 31, 31a the "East-West" movement is disposed symmetrically to the axis of one of the said cables 31, 31a with respect to an axis $XX_1$ perpendicular to the axis $aa_1$.

According to another embodiment shown in FIG. 14b, the third output axis 25 is situated on a different pitch diameter from the two other output axes; axes 31a, 31b on the contrary are situated at equal distance of axis $aa_1$ and on the same pitch diameter.

FIG. 14 shows the points where the cables 31a, 31b which control the "North-South" movement, are fastened to the mirror-holder, which points are at a distance CT which is four times the radius CT of the control member shown in FIGS. 14a, 14b. As a result, an angular movement of 60° of the control knob causes an angular movement of the mirror of 15°, i.e. a satisfactory and accurately adjustable reduction in the ratio 4 to 1.

The greatest reduction is obtained with the smallest radius CT for the control member and the greatest radius CT for the controlled member.

In the case of the other "East-West" movement, on the contrary, the distance GD of the control member may be kept as it is now, i.e. equal to half the distance GD of the controlled member; an angular deflection of 15° of the mirror is obtained for an angular movement of 30° of the control member.

With this method, it is possible, by altering the radii CT and GD of the control member and of the controlled member, to obtain the different reductions wanted, this being impossible with the known control devices.

FIGS. 15, 16, 17 and 18 show a variant embodiment wherein the cables 13a, 13b are provided at their ends with bosses 49, engaged respectively and supported in quadrangular blocks 42a, 42b mounted for sliding in slides 43a, 43b provided in the crosspiece 4. Said blocks 42a, 42b present ribs 44 which engage the guiding grooves 45a, 45b provided in the crosspiece, said blocks being held in position in the slides by one of their faces against a flange 46 integral with the lever 8.

The operating lever 8 is fast with a swivel member 47 of which the fingers 48a, 48b are respectively in contact with the blocks 42a, 42b (FIGS. 17,18).

The cable 6 is fixed in the crosspiece 4 by means of a boss 5 in the same way as shown in FIG. 2 and the said crosspiece is mounted for rotation about axis 3 on the body 1.

To obtain a "North-South" movement of the mirror, the lever 8 is caused to pivot in the bore 50 of the crosspiece 4 thereby driving the swivel member 47 in rotation, which member can move of an angle$a$ (FIG. 18), and acts with his fingers 48a, 48b on the blocks 42a, 42b which move in the slides 43a, 43b driving with them the cables 13a, 13b connected to corresponding points of the mirror.

To move the mirror left and right, the lever is actuated and moved along arrow F so that the rotation of the crosspiece 4 rotates along axis 3. The cable 6 and the cables 13a, 13b being situated on either side of the axis 3, there results a corresponding movement of the mirror-holder which is correspondingly connected to the cables.

Various modifications may of course be made by anyone skilled in the art to the devices or methods according to the invention described hereinabove within departing from its scope or its spirit.

What is claimed is:

1. An improved cable driven remote control device for permitting adjustment of a rearview mirror from inside of a vehicle door including an assembly having a longitudinal axis and adapted to be mounted in said door, a plurality of mirror driving cables, means on said assembly for receiving said cables and for guiding said cables for movement parallel to said longitudinal axis, a crosspiece having an axle, bearing means on said assembly for mounting said axle for pivotal movement of said crosspiece around an axis perpendicular to said longitudinal axis, means securing one end of one of said cables to said crosspiece, an operating lever and bearing means on said crosspiece for mounting said lever for pivoted movement around an axis which is perpendicular to the axis of movement of said crosspiece.

2. An improved device as in claim 1 in which said one cable is a first cable of three cables angularly spaced around said longitudinal axis with the first cable located on one side of the crosspiece pivot axis with respect to the other two cables, said device including a member mounted on said lever for movement around the lever axis and means connecting the other two cables to said member.

3. An improved device as in claim 2 in which said member is a generally semicircular member formed with a groove, said other two cables being connected to each other with the interconnection of the other two cables resting in said groove.

4. An improved device as in claim 3 including a pair of spaced lugs on said semicircular part adjacent to said groove and a boss on said interconnection disposed in the space between and held captive by said lugs.

5. An improved device as in claim 1 in which said operating lever has a neutral position at which the longitudinal axis thereof is generally parallel to the axes of said cables and in which said assembly is secured directly to the rearview mirror.

6. An improved device as in claim 2 in which said operating lever has a neutral position at which the longitudinal axis thereof is generally parallel to said cables and in which said assembly is secured directly to said rearview mirror, said crosspiece being formed with semicircular grooves for guiding said other two cables outwardly of said member.

7. An improved device as in claim 1 in which said operating lever has a neutral position at which its longitudinal axis is generally perpendicular to the axes of said cables, said assembly including a portion permitting mounting of said assembly on the vehicle door, said portion forming a groove receiving said lever for sliding and pivotal movement.

8. An improved device as in claim 1 including sleeves carried by said cables, a stop member formed with passages for said cables and with recesses for receiving said sleeves, said assembly including a rod for slidably receiving said stop member and a spring for biasing said sleeves into said recesses.

9. An improved device as in any one of claims 1 to 8 including three cables having three outlet axes, said outlet axes being inscribed on the same pitch diameter, the axes of two of said cables controlling one direction of movement of said mirror being arranged symmetrically on the sides of a first axes other than a cable axis, and the axis of the third cable which, with the first two cables controls another direction of movement being arranged symmetrically to the axis of one of the first two cables with respect to a second axis other than a cable axis which is perpendicular to the first axis other than a cable axis.

10. An improved device as in claim 9 in which the third cable outlet axis is located at a pitch diameter which is different from that of the first two cable outlet axes, the first two cable outlet axes being located at the same pitch diameter and at the same distance from the first axis other than a cable outlet axis.

11. An improved device as in claim 1 in which said assembly includes a swivel member having a pair of fingers, means mounting said swivel member on said operating lever with said fingers on opposite sides of the lever axis, said plurality of cables including two other cables, respective blocks on the ends of said two other cables, slides in said crosspiece for receiving said blocks, said fingers adapted to engage and move said blocks in response to rotation of said lever around its axis.

12. An improved device as in claim 11 in which each block is of quadrangular cross-section, each of said block receiving slides being at one side of said lever axis, each block being provided with a rib, and respective guiding grooves in said crosspiece for receiving said ribs.

* * * * *